United States Patent
Ficken et al.

(10) Patent No.: US 11,014,212 B2
(45) Date of Patent: May 25, 2021

(54) MANUFACTURING SYSTEM

(71) Applicant: Broetje-Automation GmbH, Rastede (DE)

(72) Inventors: Wilfried Ficken, Rastede (DE); Bernd-Michael Wolf, Rastede (DE)

(73) Assignee: Broetje-Automation GmbH, Rastede (DE)

( * ) Notice: Subject to any disclaimer, the term of this patent is extended or adjusted under 35 U.S.C. 154(b) by 274 days.

(21) Appl. No.: 15/319,094

(22) PCT Filed: Jun. 18, 2015

(86) PCT No.: PCT/EP2015/063777
§ 371 (c)(1),
(2) Date: Dec. 15, 2016

(87) PCT Pub. No.: WO2015/193464
PCT Pub. Date: Dec. 23, 2015

(65) Prior Publication Data
US 2017/0151643 A1    Jun. 1, 2017

(30) Foreign Application Priority Data
Jun. 18, 2014 (DE) .................... 10 2014 108 629.5

(51) Int. Cl.
*G01B 11/24* (2006.01)
*B21J 15/28* (2006.01)
(Continued)

(52) U.S. Cl.
CPC ........ *B23Q 17/2495* (2013.01); *B21J 15/142* (2013.01); *B21J 15/28* (2013.01);
(Continued)

(58) Field of Classification Search
CPC .... B23Q 17/2495; B23Q 15/00; B23Q 17/00; B21J 15/28; B21J 15/142; B23B 49/00;
(Continued)

(56) References Cited

U.S. PATENT DOCUMENTS 3,154,979 A   11/1964   Crispin et al.
3,559,530 A    2/1971   Wagner et al.
(Continued)

FOREIGN PATENT DOCUMENTS

CN   101817146   9/2010
DE    19859679   6/2000
(Continued)

OTHER PUBLICATIONS

"International Search Report and Written Opinion," for corresponding PCT application No. PCT/EP2015/063777 dated Sep. 11, 2015 (10 pages).
(Continued)

*Primary Examiner* — Lawrence Averick
(74) *Attorney, Agent, or Firm* — Pauly, DeVries Smith & Deffner LLC (57) ABSTRACT

A manufacturing system for producing airplane structural components, including a drilling unit for producing bores in a material assembly made of at least two material plies for the purposes of inserting fastening elements and having a measuring unit for ascertaining geometry parameters for a previously produced bore. The measuring unit includes measuring electronics with an optical sensor element, a measuring optical unit and a measuring lance. The measuring unit produces an optical measurement beam that emerges from the measuring lance via the measuring optical unit and that is incident on a measurement point on the respective bore inner surface. A measurement movement between measuring lance and material assembly is provided
(Continued)

in a measurement cycle and the measuring unit cyclically ascertains distance values to various measurement points at a scanning rate during the measurement movement and ascertains at least one geometry parameter for the respective bore from the distance values.

19 Claims, 4 Drawing Sheets

(51) Int. Cl.
    *B23B 49/00*     (2006.01)
    *G01B 11/08*     (2006.01)
    *B23Q 17/24*     (2006.01)
    *G01B 9/023*     (2006.01)
    *B21J 15/14*     (2006.01)
    *G01B 9/02*     (2006.01)

(52) U.S. Cl.
    CPC ............. *B23B 49/00* (2013.01); *G01B 9/02* (2013.01); *G01B 9/023* (2013.01); *G01B 11/08* (2013.01); *G01B 11/24* (2013.01); *G01B 11/2408* (2013.01); *B23B 2215/04* (2013.01); *B23B 2260/128* (2013.01); *B23B 2270/48* (2013.01)

(58) Field of Classification Search
    CPC ............ B23B 2270/48; B23B 2215/04; B23B 2260/128; G01B 11/2408; G01B 9/02; G01B 11/08; G01B 11/24; G01B 9/023; B25H 7/00; A41H 1/00; A43D 1/02; A61B 5/103; A45B 3/08; G01C 11/00; G01L 1/00; G03B 1/60; G06K 11/00; H05B 31/34
    See application file for complete search history.

(56) References Cited

U.S. PATENT DOCUMENTS

| | | | |
|---|---|---|---|
| 3,858,731 A | 1/1975 | Briggs | |
| 4,728,229 A | 3/1988 | Memmel et al. | |
| 4,753,555 A | 6/1988 | Yousko et al. | |
| 4,759,109 A | 7/1988 | Mason et al. | |
| 4,861,984 A | 8/1989 | West | |
| 4,966,323 A | 10/1990 | Weaver et al. | |
| 5,231,747 A | 8/1993 | Givler et al. | |
| 5,329,691 A | 7/1994 | Zienkiewicz et al. | |
| 5,339,152 A | 8/1994 | Horn et al. | |
| 5,404,633 A | 4/1995 | Givler et al. | |
| 5,699,599 A | 12/1997 | Zieve | |
| 5,701,651 A | 12/1997 | Nelson et al. | |
| 5,778,505 A | 7/1998 | Reilly et al. | |
| 5,848,458 A | 12/1998 | Bullen | |
| 5,910,894 A * | 6/1999 | Pryor | G05B 19/41875 219/121.64 |
| 5,914,876 A | 6/1999 | Hirai | |
| 5,917,726 A * | 6/1999 | Pryor | G05B 19/4189 700/95 |
| 5,920,974 A | 7/1999 | Bullen et al. | |
| 6,001,181 A | 12/1999 | Bullen | |
| 6,223,413 B1 | 5/2001 | Crocker et al. | |
| 6,237,212 B1 | 5/2001 | Speller, Jr. et al. | |
| 6,254,317 B1 | 7/2001 | Chang | |
| 6,775,897 B2 | 8/2004 | Eisenhauer et al. | |
| 7,444,728 B2 | 11/2008 | Wesseloh | |
| 7,507,059 B2 | 3/2009 | Hamann | |
| 7,566,193 B2 | 7/2009 | Haj-Fraj et al. | |
| 7,682,112 B2 | 3/2010 | Panczuk et al. | |
| 8,220,134 B2 | 7/2012 | Matheis et al. | |
| 8,302,321 B2 * | 11/2012 | Hunter | G01B 21/04 33/503 |
| 8,978,231 B2 * | 3/2015 | LeMieux | B21J 15/28 29/524.1 |
| 9,157,735 B2 * | 10/2015 | Haisty | G01B 5/12 |
| 9,272,338 B2 | 3/2016 | Fujita et al. | |
| 9,868,549 B2 | 1/2018 | Goehlich et al. | |
| 2002/0113354 A1 | 8/2002 | Mangelsen et al. | |
| 2004/0090635 A1 * | 5/2004 | Franz | G01B 11/22 356/498 |
| 2004/0093731 A1 | 5/2004 | Sarh et al. | |
| 2006/0039765 A1 | 2/2006 | Hamann | |
| 2006/0230609 A1 * | 10/2006 | Wang | B21J 15/025 29/798 |
| 2007/0153296 A1 | 7/2007 | Schick | |
| 2007/0274797 A1 | 11/2007 | Panczuk et al. | |
| 2008/0254959 A1 | 10/2008 | Takayama et al. | |
| 2010/0011563 A1 | 1/2010 | Burns et al. | |
| 2013/0192050 A1 * | 8/2013 | LeMieux | B21J 15/02 29/524.1 |
| 2013/0336737 A1 | 12/2013 | Fujita et al. | |
| 2014/0095107 A1 * | 4/2014 | Haisty | G01B 21/18 702/166 |
| 2014/0253913 A1 * | 9/2014 | Bergman | G01N 21/954 356/241.1 |
| 2017/0333976 A1 | 11/2017 | Varrelmann | |
| 2018/0297107 A1 | 10/2018 | Meiners | |
| 2019/0001398 A1 | 1/2019 | Varrelmann | |

FOREIGN PATENT DOCUMENTS

| | | |
|---|---|---|
| DE | 102005023353 | 1/2006 |
| DE | 102008044262 | 6/2010 |
| DE | 202013003544 | 8/2014 |
| DE | 102013006506 | 10/2014 |
| DE | 102013110684 | 3/2015 |
| EP | 0566770 | 10/1993 |
| EP | 0600614 | 6/1994 |
| EP | 0956915 | 11/1999 |
| EP | 2090386 | 7/2010 |
| EP | 2792431 | 10/2014 |
| GB | 712624 | 7/1954 |
| WO | 9937429 | 7/1999 |
| WO | 2005065864 | 7/2005 |
| WO | 2015193464 | 12/2015 |
| WO | 2016046185 | 3/2016 |
| WO | 2016174133 | 11/2016 |

OTHER PUBLICATIONS

"International Search Report and Written Opinion," for corresponding PCT application No. PCT/EP2015/071688 dated Dec. 2, 2015 (12 pages).
International Preliminary Report on Patentability for corresponding PCT application No. PCT/EP2015/063777 dated Dec. 20, 2016 (7 pages), English translation.
International Preliminary Report on Patentability for PCT Application No. PCT/EP2016/059480 dated Oct. 31, 2017 (6 pages), English translation.
International Preliminary Report on Patentability for PCT/EP2015/071688 dated Apr. 6, 2017 (8 pages).
International Search Report and Written Opinion for PCT Application No. PCT/EP2016/059480 dated Aug. 29, 2016 (20 pages) with English translation.
Non-Final Office Action for U.S. Appl. No. 15/513,244 dated Sep. 17, 2019 (36 pages).
Non-Final Office Action for U.S. Appl. No. 15/569,357 dated Jan. 22, 2020 (33 pages).
Response to Non-Final Rejection dated Sep. 17, 2019 for U.S. Appl. No. 15/513,244, submitted via EFS-Web on Jan. 17, 2020, 10 pages.
Non-Final Office Action for U.S. Appl. No. 15/752,371 dated Dec. 7, 2020 (28 pages).
Notice of Allowance for U.S. Appl. No. 15/513,244 dated Jan. 12, 2021 (22 pages).
Final Office Action for U.S. Appl. No. 15/513,244 dated May 1, 2020 (20 pages).

(56) References Cited

OTHER PUBLICATIONS

Final Office Action for U.S. Appl. No. 15/569,357 dated Aug. 7, 2020 (15 pages).
Non-Final Office Action for U.S. Appl. No. 15/752,371 dated May 11, 2020 (41 pages).
Response to Final Rejection dated May 1, 2020 for U.S. Appl. No. 15/513,244, submitted via EFS-Web on Sep. 1, 2020, 10 pages.
Response to Non-Final Rejection dated Jan. 22, 2020 for U.S. Appl. No. 15/569,357, submitted via EFS-Web on Jun. 22, 2020, 9 pages.
Response to Non-Final Rejection dated May 11, 2020 for U.S. Appl. No. 15/752,371, submitted via EFS-Web on Sep. 11, 2020, 11 pages.

* cited by examiner

MANUFACTURING SYSTEM

CROSS-REFERENCE TO RELATED APPLICATIONS

This application is a national stage application under 35 U.S.C. 371 of International Patent Application Serial No. PCT/EP2015/063777, entitled "Fertigungssystem," filed Jun. 18, 2015, which claims priority from German Patent Application No. DE 10 2014 108 629.5, filed Jun. 18, 2014 the disclosure of which is incorporated herein by reference.

FIELD OF THE TECHNOLOGY

The disclosure relates to a manufacturing system for producing airplane structural components and a method for operating such a manufacturing system.

BACKGROUND

A large number of rivet connections regularly have to be made when producing airplane structural components, with these rivet connections increasingly being made in an automated manner. The manufacturing system in question serves this purpose and can be used to realize an automated sequence of drill and rivet cycles.

The known manufacturing system (EP 0 600 614 A1), from which the disclosure proceeds, is equipped with a drilling unit for producing bores in a material assembly and with a rivet unit. Furthermore, the known manufacturing system has a measuring unit for ascertaining geometry parameters for the bore, specifically for ascertaining the respective diameter of the bore.

The measuring unit of the known manufacturing system is configured as a capacitive measuring unit. The capacitive measuring probe therein is positioned at a predetermined measurement position within the bore to be measured in a measurement cycle. Subsequently, there is the capacitive measurement by an appropriate actuation of the capacitive measuring probe. Along the bore axis, the measuring probe is subdivided into a plurality of portions. The portions to be measured are fixedly predetermined by the geometry of the capacitive measuring probe, and so the flexibility of the manufacturing system is restricted.

The known manufacturing system is not very advantageous, specifically in view of the application within the scope of rivet connections in airplane structural components. Firstly, this is due to the fact that a bore contour along the bore axis cannot be measured or can only be measured at low resolution. By way of example, the geometry of a countersink or a position of a separating plane between two material plies is not ascertainable, or only ascertainable in an imprecise manner, using the measuring unit of the known manufacturing system.

A further problem in the known manufacturing system is the fact that the material plies in the field under consideration here are often formed from different materials, which may have a significant influence on the measurement accuracy when using a capacitive measuring probe. This becomes particularly clear in the case of a material assembly in which one material ply is designed as a fiber composite material ply. The capacitive measuring unit of the known manufacturing system cannot be used for such material assemblies, which are of growing importance in the aerospace sector.

SUMMARY

The disclosure is based on the problem of configuring and developing the known manufacturing system in such a way that ascertaining geometry parameters for bores in material assemblies made of at least two material plies is improved in view of flexibility and measurement accuracy.

In the case of a manufacturing system as described herein, the above problem is solved.

The essential basic idea is that point-by-point, optical scanning of the bore inner surface in the material assemblies made of at least two material plies in question here is particularly advantageous.

Given a suitable design, the geometry parameters may be ascertained in a largely material-independent manner provided that the respective material surface ensures a sufficient reflection of the optical measurement beam. As a result, even very different material combinations within the material assemblies are unproblematic.

Furthermore, point-by-point scanning of the bore inner surface permits a virtually unlimited flexibility when scanning, provided that a corresponding measurement movement is undertaken.

Finally, a high measurement resolution reproducing the minimum distance at which two measurement points which are adjacent in the transverse direction are still distinguishable may be realized in the transverse direction with respect to the measurement beam. Below, this measurement resolution is referred to as "in-plane resolution". The preconditions for a high in-plane resolution are a high accuracy of the measurement movement and a small beam diameter of the measurement beam.

In detail, what is proposed now is that the measuring unit comprises measuring electronics with an optical sensor element, a measuring optical unit and a measuring lance. For the purposes of ascertaining a distance between the measuring lance and a measurement point on the bore inner surface, the measuring unit produces an optical measurement beam which emerges from the measuring lance via the measuring optical unit and is incident on the measurement point on the bore inner surface. Here the measuring unit is an interferometer arrangement in which the respective distance is ascertained with the aid of light interference ("Fachlexikon-ABC Messtechnik", VGB Fachbuchverlag Leipzig 1985, ISBN 3-87 144-846-X, page 214). By way of example, such a measuring unit may be constructed as shown in DE 10 2005 023 353 A1.

Depending on the configuration of the measuring unit, the ascertained distance values may be absolute distances or merely changes of distance. In the latter case, it may be necessary to undertake a calibration of the measuring unit on a regular basis, for example by a measurement on a calibration bore.

The above scanning, in accordance with the proposal, is undertaken in measurement cycles, in which there is provision for a measurement movement between the measuring lance and the material assembly in each case. During the measurement movement, the measuring unit cyclically ascertains distance values to various measurement points at a scanning rate. The measuring unit in turn ascertains at least one geometry parameter for the bore from the distance values.

The above measurement movement is a relative movement between measuring lance and material assembly. To this end, there may be provision for moving both the measuring lance and the material assembly, or only one of these components.

In an embodiment, the measurement cycles are integrated into a manufacturing process. As a result of this, it is possible, in particular, to react to deviations in the ascertained geometry parameters within the manufacturing process—and hence react quickly.

In an embodiment, the manufacturing process controller also comprises a tolerance query for the ascertained geometry parameters in view of predetermined tolerance criteria. Appropriate measures may be introduced on the part of the manufacturing process controller depending on the proximity to the tolerance criteria or on the tolerance criteria being overshot or undershot. By way of example, such measures may be a drill change, an adaptation of drill parameters or the like.

In an embodiment, the measurement movement, in particular the measurement movement of the measuring lance, is a substantially spiral movement such that the measurement points lie on a substantially spiral measurement curve. As a result, it is possible to scan the bore inner surface over the entire bore depth by way of a single, continuous movement. Various embodiments include variants of geometry parameters which are ascertained from the measured distance values. From this, it becomes particularly clear that the proposed solution is accompanied by a high degree of flexibility for ascertaining geometry parameters.

From various embodiments, it becomes clear that the individual material plies may be scanned in a targeted manner and individually by the solution in accordance with the proposal. This moreover relates to the possibility of a measurement cycle which is directed to the region of the separating plane between two material plies and/or to the region around the separating plane between two material plies.

An embodiment, which provides for different measurement parameters to be able to be provided for different measurement cycles or measurement sub-cycles, is of particular importance. By way of example, the measurement cycles may be subdivided into coarse measurement cycles, which facilitate a quick but imprecise measurement, and fine measurement cycles, which facilitate an accurate but time-consuming measurement. Thus, by way of the solution in accordance with the proposal, it is possible to provide for a high measurement accuracy only when the latter is really required. This allows the cycle time during automated manufacturing to be reduced.

An embodiment provides a method for operating a manufacturing system in accordance with the proposal is claimed. The essential aspect is the basic consideration of integrating the measurement cycles into the manufacturing process in the manufacturing system in accordance with the proposal as mentioned above. Reference may be made to all explanations in relation to the mode of operation of the manufacturing process controller in accordance with the proposal.

An embodiment provides a manufacturing system for producing airplane structural components, comprising a drilling unit for producing bores in a material assembly made of at least two material plies for the purposes of inserting fastening elements, in particular rivet elements, and comprising a measuring unit for ascertaining at least one geometry parameter for a previously produced bore, wherein the measuring unit comprises measuring electronics with an optical sensor element, a measuring optical unit and a measuring lance, in that the measuring unit produces an optical measurement beam for ascertaining a distance between the measuring lance and a measurement point on the respective bore inner surface, said optical measurement beam emerging from the measuring lance via the measuring optical unit and being incident on the measurement point on the respective bore inner surface, in that there is provision for a measurement movement between measuring lance and material assembly in a measurement cycle and the measuring unit cyclically ascertains distance values to various measurement points at a scanning rate during the measurement movement and ascertains at least one geometry parameter for the respective bore from the distance values.

In an embodiment, the manufacturing system comprises a riveting unit for riveting the material assembly.

In an embodiment, the measuring lance plunges into the respective bore during a measurement cycle and the measurement beam extends substantially across the bore axis.

In an embodiment, the drilling unit and the measuring unit are combined to form a processing head, such as the drilling unit, the riveting unit and the measuring unit are combined to form a processing head.

In an embodiment, there is provision for a manufacturing process controller for actuating the components of the manufacturing system and in that, by actuating the components of the manufacturing system, the manufacturing process controller works through a sequence of drill cycles by means of the drilling unit and optionally rivet cycles by means of the riveting unit according to a manufacturing instruction and works through predetermined measurement cycles between predetermined drill cycles and/or rivet cycles according to a measurement instruction.

In an embodiment, the measurement movement has a rotational component, such as the rotational component is a rotational movement about the longitudinal axis of the measuring lance.

In an embodiment, the measurement movement has a linear component, such as the linear component is aligned in the direction of the longitudinal axis of the measuring lance.

In an embodiment, the measurement movement is a substantially spiral movement such that the measurement points lie on a substantially spiral measurement curve.

In an embodiment, there is provision for a drive arrangement for the motor-driven movement of the drilling unit and/or the measuring unit and/or an optionally provided riveting unit, such as a head drive arrangement with at least one drive for positioning the processing head relative to the material assembly in a motor-driven manner is assigned to the drive arrangement.

In an embodiment, a geometry parameter is the diameter or the roundness of the respective bore.

In an embodiment, the respective bore has a countersink and in that a geometry parameter is the countersink depth or the countersink angle or the countersink diameter of the bore.

In an embodiment, the respective bore has a countersink, in that a geometry parameter relates to the transition, in particular a transition radius, from the countersink to the bore shaft adjoining the countersink.

In an embodiment, a geometry parameter is the surface condition, in particular the surface structure, of the bore inner surface.

In an embodiment, a geometry parameter is the assembly strength of the material assembly along the bore axis.

In an embodiment, a geometry parameter is the position of the separating plane between two material plies of the material assembly.

In an embodiment, a geometry parameter is the width of a gap possibly present between two material plies of the material assembly.

In an embodiment, a measurement cycle is directed only to some of the material plies, such as only to a single material ply.

In an embodiment, a measurement cycle comprises at least two measurement sub-cycles, in that the measurement sub-cycles are worked through in succession and in that the geometry parameters are ascertained for each of the measurement sub-cycles separately.

In an embodiment, a measurement sub-cycle is directed to one material ply of the material assembly and in that a further measurement sub-cycle is directed to a further material ply of the material assembly.

In an embodiment, least two measurement sub-cycles are carried out immediately in succession, such as the measurement movement of a first measurement sub-cycle immediately and continuously adjoins the measurement movement of a second measurement sub-cycle.

In an embodiment, the measurement parameters, in particular the geometries of the measurement movements and/or the speeds of the measurement movements and/or the scanning rates, are different in the case of at least two different measurement cycles or measurement sub-cycles.

In an embodiment, in a measurement cycle, the distances between adjacent measurement points on the bore inner surface define the in-plane resolution of the measuring unit for this measurement cycle, in that the in-plane resolution is adjustable by matching the measurement movement, in particular the speed of the measurement movement along a measurement curve on the bore inner surface, to the scanning rate, and in that the in-plane resolutions are set differently within a measurement cycle or in the case of at least two different measurement cycles or measurement sub-cycles.

In an embodiment, the measurement parameters, in particular the geometry of the measurement movement and/or the speed of the measurement movement and/or the scanning rates, are different within a measurement cycle.

An embodiment provides a method for operating a manufacturing system as described herein, wherein there is provision for a manufacturing process controller for actuating the components of the manufacturing system and in that, by actuating the components of the manufacturing system, a sequence of drill cycles and optionally rivet cycles is worked through according to a manufacturing instruction and predetermined measurement cycles between predetermined drill cycles and/or rivet cycles are worked through according to a measurement instruction by means of the manufacturing process controller.

In an embodiment, at least one material ply is formed from a non-metallic material, such as from a fiber composite material.

BRIEF DESCRIPTION OF THE FIGURES

Below, various embodiments will be explained in more detail on the basis of drawings depicting merely one exemplary embodiment. In the drawings.

DETAILED DESCRIPTION

Figure 1:
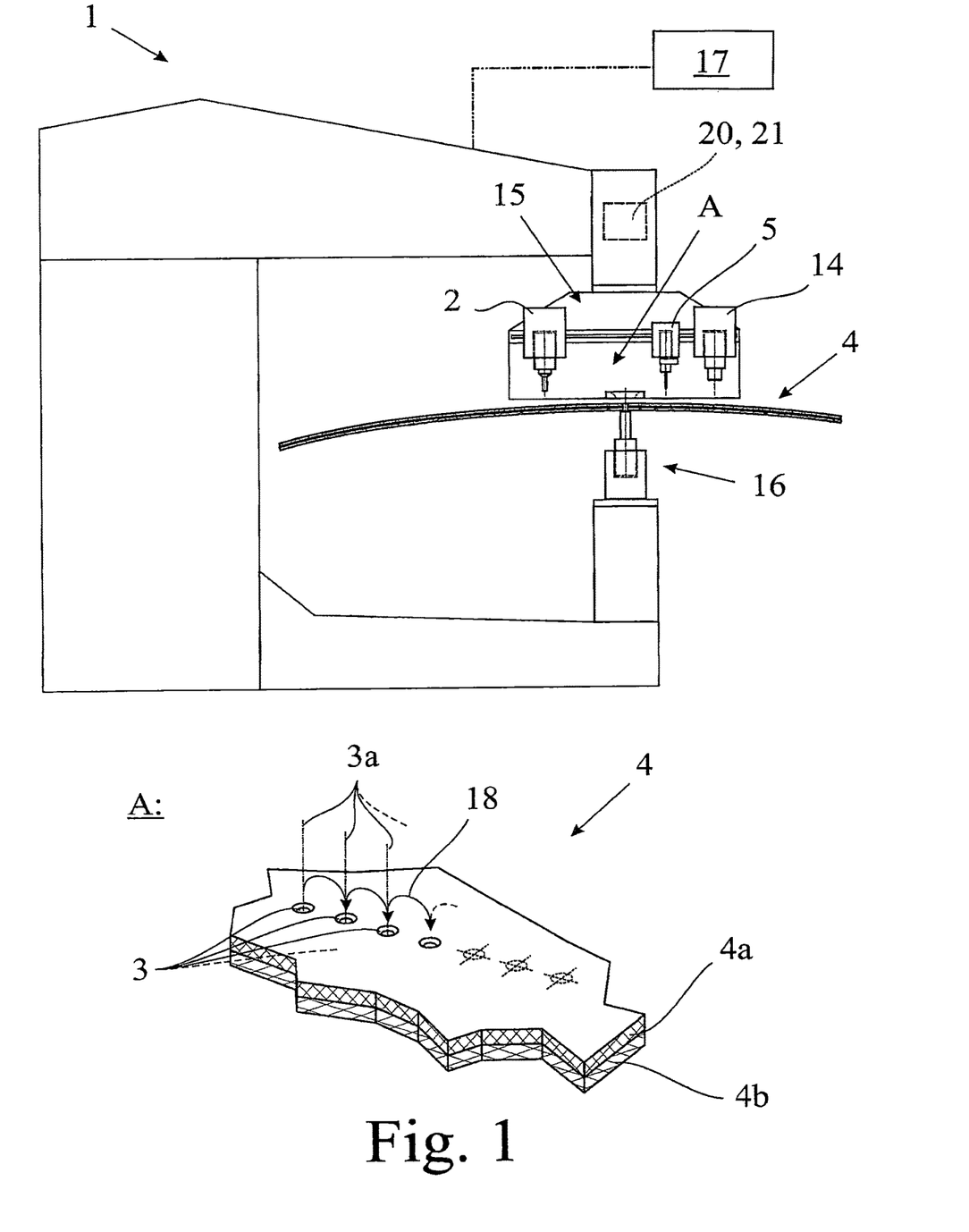
FIG. 1 shows a manufacturing system in accordance with the proposal in a very schematic illustration.

The manufacturing system 1 depicted in FIG. 1 is configured to make rivet connections on airplane structural components, in particular on structural components of a fuselage or a wing for an airplane in this case. Accordingly, the manufacturing system 1 is equipped with a drilling unit 2 for producing bores 3 in a material assembly 4 made of at least two material plies 4a, 4b for the purposes of inserting fastening elements, rivet elements (not depicted) in this case. While riveting itself is explained below, measuring the bores 3 is in the foreground in this case. To this end, there is provision for a measuring unit 5 for ascertaining geometry parameters for the produced bores 3.

The measuring unit 5 comprises measuring electronics 6 with an optical sensor element 7, a measuring optical unit 8 and a measuring lance 9, the measuring unit 5 producing an optical measurement beam 13 for ascertaining a distance 10 between the measuring lance 9 and a measurement point 11 on the respective bore inner surface 12, said optical measurement beam emerging from the measuring lance 9 via the measuring optical unit 8 and being incident on the measurement point 11 on the respective bore inner surface 12. The measuring unit 5 with the aforementioned components is configured here as an interferometer arrangement for measuring distance, as indicated above, in particular as a white-light interferometer arrangement. However, it is also conceivable for the measuring unit to be configured as a laser interferometer arrangement.

In accordance with the proposal, there is provision for a measurement movement between measuring lance 9 and material assembly 4 in a measurement cycle. Here the measurement movement is traced back to a movement of the measuring lance 9 only. It is also conceivable for both the measuring lance 9 and the material assembly 4 to be moved accordingly for the purposes of implementing the measurement movement.

During the measurement movement, the measuring unit 5 cyclically ascertains distance values to various measurement points 11 at a scanning rate, with at least one geometry parameter for the bore 3 to be measured being ascertained from the distance values by means of the measuring unit 5.

Here, the manufacturing system 1 additionally comprises a riveting unit 14 for riveting the material assembly 4, as indicated above. This may be gathered schematically from the illustration in accordance with FIG. 2.

Figure 3:
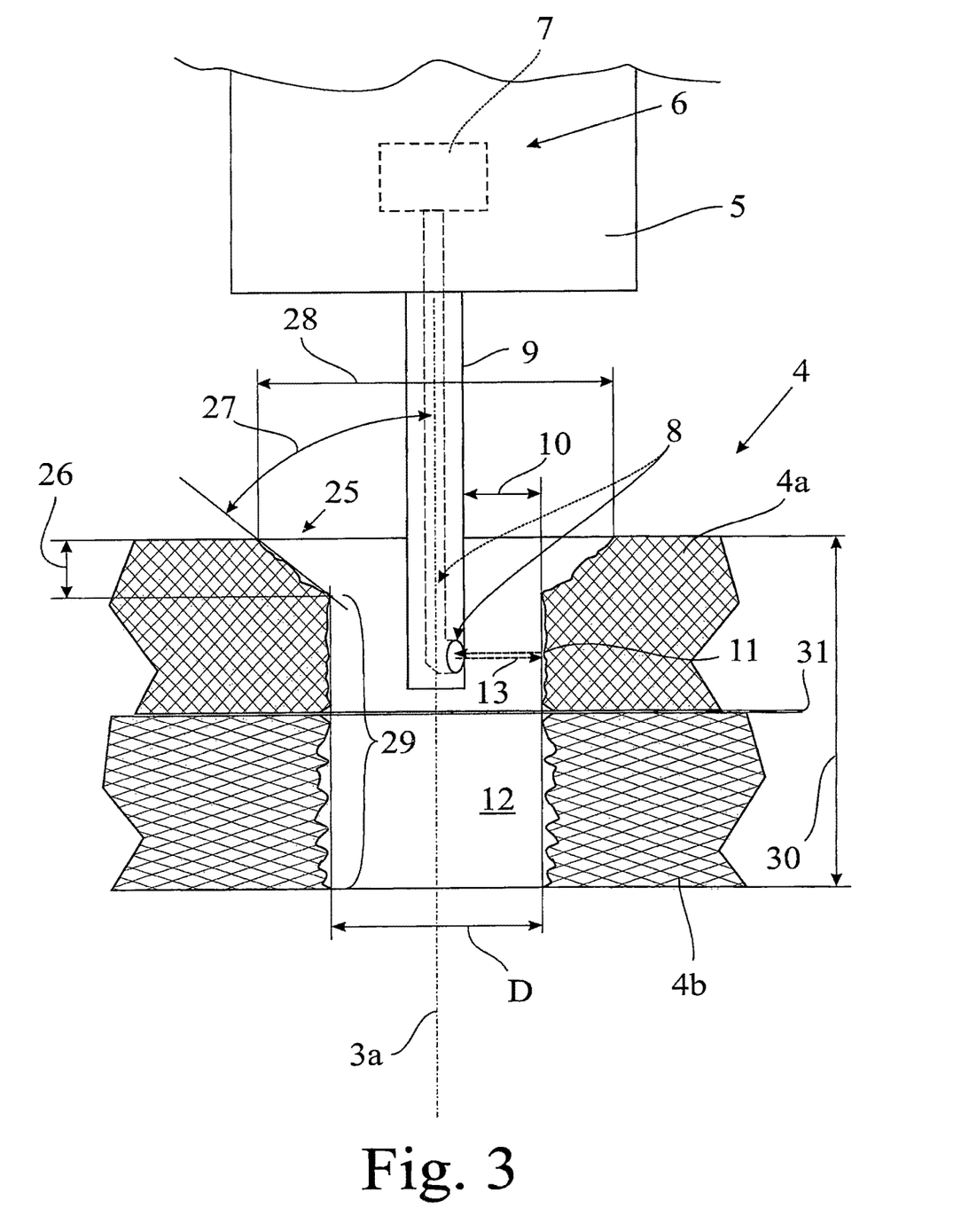
FIG. 3 shows the processing head in accordance with FIG. 2 during a measurement cycle in a sectional view along the cut line III-III.

FIG. 3 shows that the measuring lance 9 plunges into the respective bore 3 to be measured during a measurement cycle, with the measurement beam 13 extending substantially across the bore axis 3a.

Figure 2:
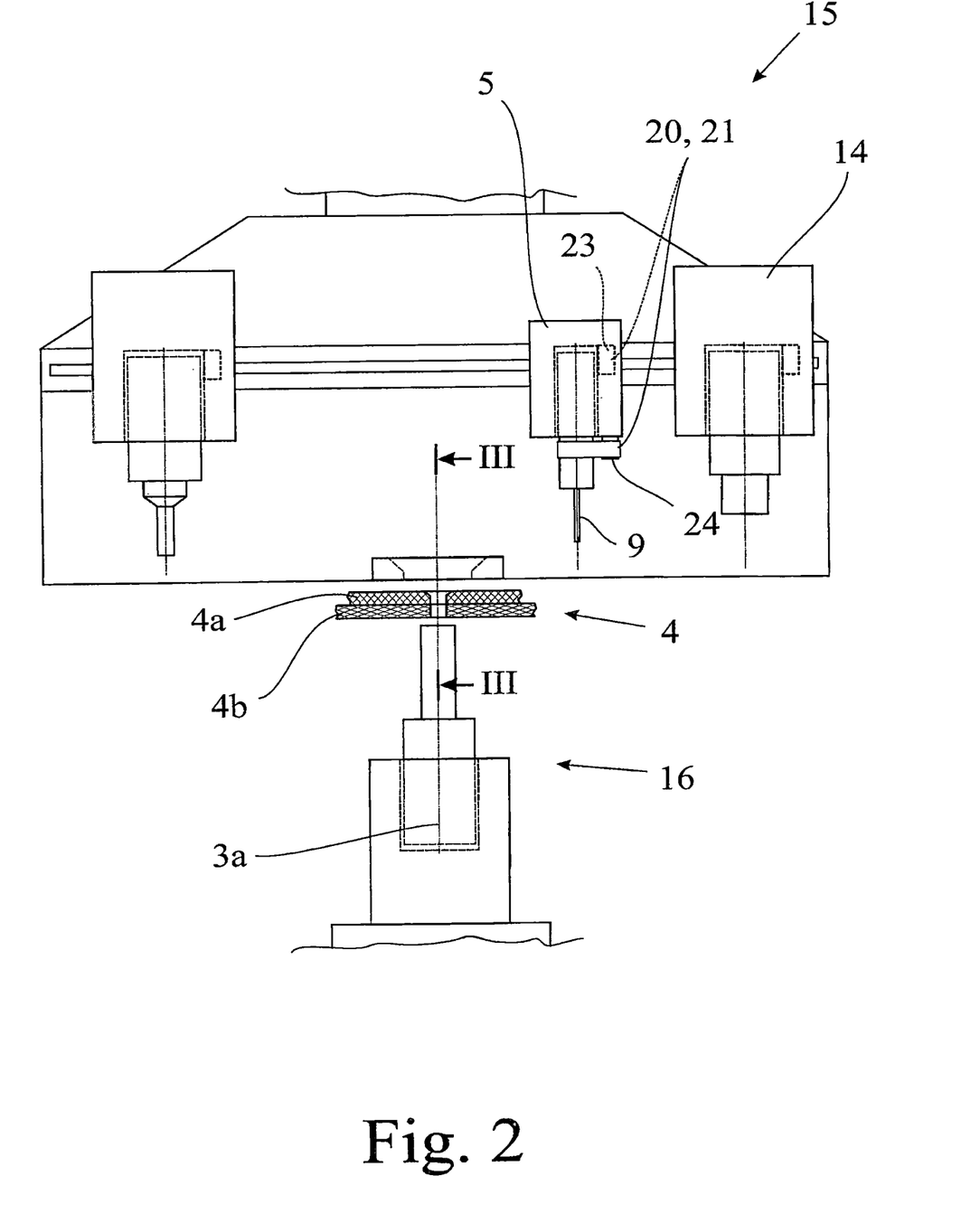
FIG. 2 shows the region of the processing head of the manufacturing system in accordance with FIG. 1 in a detailed illustration.

A particularly compact configuration of the manufacturing system 1 emerges by virtue of the drilling unit 2, the measuring unit 5 and the riveting unit 14, provided here being combined to form a processing head 15. In one sense, the processing head 15 constitutes an upper tool for processing the material assembly 4. FIG. 2 further shows a lower tool 16, which interacts with the riveting unit 14 assigned to the upper tool when the rivet connection is made.

FIG. 1 very schematically shows a manufacturing process controller 17 for actuating the components of the manufacturing system 1. Here, the manufacturing process controller 17 is a central controller. However, it is also conceivable for the manufacturing process controller 17 to be decentralized, i.e. arranged in a distributed manner.

By actuating the components of the manufacturing system 1, the manufacturing process controller 17 works through a sequence of drill cycles and also, here rivet cycles according to a manufacturing instruction and works through predetermined measurement cycles between predetermined drill cycles and/or rivet cycles according to a measurement instruction. The sequence of drill and/or rivet cycles is indicated in FIG. 1 by the arrows with the reference sign 18. Indicated here with the dashed lines are drill positions which have not yet been approached.

An example of a manufacturing instruction is sequential drilling and riveting of the bores 3 arranged in a row in FIG. 1. By way of example, a measurement instruction may consist of undertaking a measurement cycle after each third drill cycle before the corresponding rivet cycle is undertaken.

A clamping apparatus, which presses together the material plies 4a, 4b of the material assembly 4 in such a way that no gaps or only small gaps may form in the separating plane, is not depicted here. Regularly, such a clamping apparatus is equipped with an upper pressure plunger bushing arranged at the processing head 15 and with a lower pressure plunger bushing arranged at the lower tool 16.

Overall, the following procedure emerges for each bore 3 using the manufacturing system in accordance with the proposal: initially, the respectively required drill is selected and inserted into the drilling unit 2 by way of a drill interchange system. Furthermore, the corresponding rivet is selected and transported to the riveting unit 14. Subsequently, the material assembly 4 is clamped by means of the clamping arrangement. This is followed by a drill cycle by means of the drilling unit 2, said drill cycle regularly consisting of the drilling and countersinking work steps. Depending on the measurement instruction, this is now followed by a measurement cycle to ascertain at least one geometry parameter of the produced bore 3. In principle, there may be provision here for the rivet not to be selected until this time as the selection of the rivet may depend on the ascertained geometry parameters. This is followed by a rivet cycle by means of the riveting unit 14, said rivet cycle being composed of the insertion of the rivet into the bore 3 and the reshaping of the rivet. Finally, a further, such as optical, measuring system—not depicted here—is used to check the set-head projection and the parallelism of the rivet head in relation to the surface of the material assembly 4.

The measurement movement to be undertaken within the scope of a measurement cycle can have a rotational component which can be a rotational movement about the longitudinal axis of the measuring lance 9. Here, the measurement movement additionally has a linear component which can be aligned in the direction of the longitudinal axis of the measuring lance 9.

What emerges as a result is that the measurement movement can be a substantially spiral movement such that the measurement points on the bore inner wall 12 lie on a substantially spiral measurement curve. The spiral movement is indicated by reference sign 19 in FIG. 4.

In order to ensure automated manufacturing, there can be provision for a drive arrangement 20 for the motor-driven movement of the drilling unit 2 and/or the measuring unit 5 and/or the riveting unit 14, which is provided here. In this case, a head drive arrangement 21 with at least one drive for positioning the processing head 15 in a motor-driven manner is initially assigned to the drive arrangement 20. The head drive arrangement 21 may be provided in a single-axis or multi-axis form and is merely indicated in FIG. 1.

Here, the drive arrangement 20 also comprises a drive for displacing the drilling unit 2, the measuring unit 5 and the riveting unit 14 relative to the processing head 15 itself. As a result, the drilling unit 2, the measuring unit 5 and the riveting unit 14 may each be displaced from the depicted parked positions into an operating position, in each case by a lateral movement in FIG. 2. Here, the operating position is situated in a central region of the processing head 15.

Furthermore, it is the case here, that a measurement drive arrangement 22 with at least one drive 23, 24 for the motor-driven positioning of the measuring lance 9 is assigned to the drive arrangement 20. It is the case here, that the measurement drive arrangement 22 has a drive 23 for the above linear component of the measurement movement and a drive 24 for the above rotational component of the measurement movement. Using the two drives 23, 24, a motor-driven displacement of the measuring lance 9 relative to the processing head 15 is possible.

In principle, there may be provision for a drive of the drive arrangement 20 to be used twice, specifically both as head drive arrangement 21 and as measurement drive arrangement 22. In principle, this applies to the head drive arrangement 21 to the extent that, as depicted, the measuring unit 5 is arranged at the processing head 15 and hence the measuring unit 5 is movable by means of the head drive arrangement 21.

It is possible to ascertain many different geometry parameters for the bore 3 to be measured in each case from the distance data obtained in a measurement cycle.

In an embodiment, the geometry parameter is the diameter D or the roundness of the bore 3. The diameter of the bore 3 may be calculated from the ascertained distance data in a known manner, particularly in the case where the measuring lance 9 has completed at least one full revolution while, at the same time, scanning the bore inner surface 12.

A geometry parameter may be the countersink depth 26 or the countersink angle 27 or the countersink diameter 28 of the respective bore 3 if a countersink 25 (FIG. 3) has been produced during the drill cycle. In principle, a rotation of the measuring lance 9 may be dispensed with for ascertaining countersink depth 26 and countersink angle 27. All that is required here is a measurement movement in the direction of the measuring lance 9 while scanning at the same time. By contrast, the measuring lance needs to be positioned at the upper edge of the countersink 25 and subsequently set in rotation in order to ascertain the countersink diameter. As a result of the surface of the countersink 25 not being an ideally mirroring surface, a distance measurement may regularly be performed, as a rule, using the measurement beam 13 propagating across the bore axis 3a. However, it is also conceivable for the countersink diameter 28 to be deduced from the countersink depth 26 and the countersink angle 27.

Reference may be made to the fact that the measuring lance 9 can be aligned on the bore axis 3a during the measurement cycle. In particular, this applies to all measurement cycles in which diameter values are intended to be deduced from the distance data.

In the aforementioned case where the bore 3 is equipped with a countersink 25, very particular importance is placed on the transition from the countersink 25 to the bore shaft 29, i.e. the cylindrical part of the bore 3. Indications of the drill wear and tear can be seen from this transition, in particular from the transition radius there. Accordingly, a geometry parameter for the bore 3 can relate to the transition from the countersink 25 to the bore shaft 29.

The surface condition, in particular the surface structure, of the bore inner surface 12 may also provide information about the drill wear and tear. Accordingly, it is the case here, that a geometry parameter is the surface condition, in particular the surface structure, of the bore inner surface 12.

The assembly strength 30 of the material assembly 4 along the bore axis 3a, which is also referred to as "clamping length", may be of importance, in particular for the rivet selection. The assembly strength 30 may in turn be ascertained by a purely linear movement of the measuring lance 9.

The position of the separating plane 31 between two material plies 4a, 4b of the material assembly 4 is a further geometry parameter which may be ascertained using a purely linear measurement movement.

Finally, the width of a gap possibly present between two material plies 4a, 4b of the material assembly 4 is a geometry parameter. Such a gap may be scanned, for example in respect of the existence/non-existence thereof, by way of a suitable measurement movement.

What is of interest in the discussion above relating to the geometry parameters is the fact that a number of geometry parameters, in particular ascertainment of diameters, require a rotational movement of the measuring lance 9, while other geometry parameters, for example ascertaining the assembly strength 30, merely require a linear measurement movement of the measuring lance 9. In this respect, the spiral measurement movement mentioned further above presents itself as universal and advantageous to the extent that each one of the aforementioned geometry parameters is ascertainable using only a single measurement movement given a suitable design of the spiral measurement movement.

In principle, there may be provision for a measurement cycle always to be directed to all material plies 4a, 4b. However, it may also be advantageous for a measurement cycle to be directed only to some of the material plies 4a, 4b, in particular even only to a single material ply 4a, 4b. The latter case may be advantageous for cycle time reasons. The phrasing "directed" in this case describes which region, in particular which material plies 4a, 4b, are scanned.

A measurement cycle may also comprise two or more measurement sub-cycles 32, 33 which are worked through in succession, with the geometry parameters being ascertained for each of the measurement sub-cycles 32, 33 separately. This is particularly advantageous if the measurement sub-cycles 32, 33 are each directed to a different material ply 4a, 4b of the material assembly 4. In the measurement cycles indicated in FIG. 4, two measurement sub-cycles 32, 33 are provided in each case, said measurement sub-cycles being carried out immediately in succession. In this case, the measurement movement of the first measurement sub-cycle 32 immediately and continuously adjoins the measurement movement of the second measurement sub-cycle 33. Here, both measurement movements have a spiral design. They merge seamlessly into one another.

Figure 4:
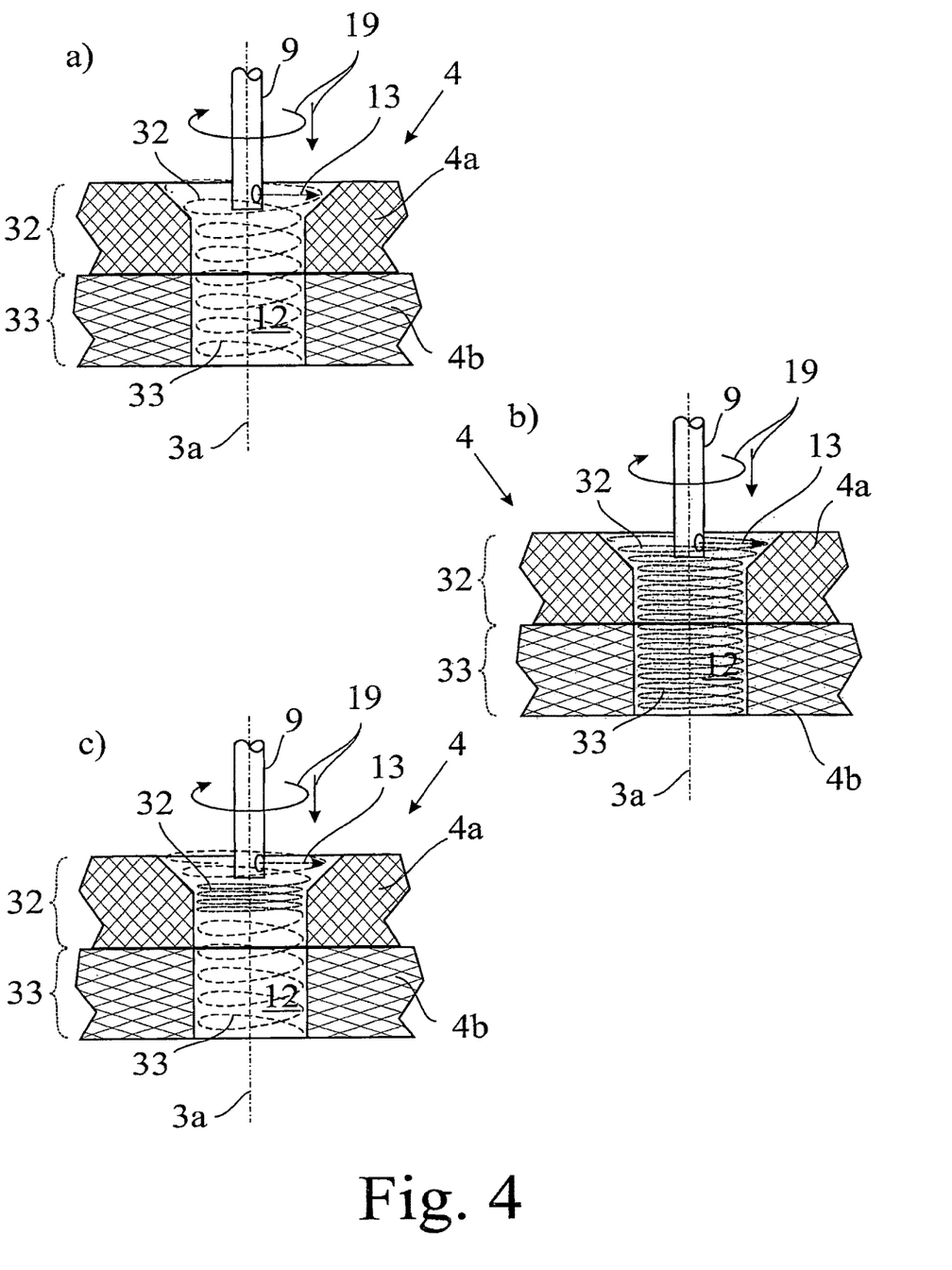
FIG. 4 shows the arrangement in accordance with FIG. 3 with an indicated measurement movement of the measuring lance a) for a spiral measurement path with a large spiral gradient, b) for a spiral measurement path with a small spiral gradient and c) for a spiral measurement path with different spiral gradients.

In FIG. 4, the measurement sub-cycles 32, 33 are indicated on the basis of the spatial extent of the measurement curves thereof. What may be gathered from the illustration in accordance with FIG. 4 is that the upper measurement sub-cycle 32 is directed to the upper material ply 4a and the lower measurement sub-cycle 33 is directed to the lower material ply 4b. As a result, the geometry parameters for the individual material plies 4a, 4b may be ascertained separately from one another in a simple manner.

A comparison between FIG. 4a and FIG. 4b yields that it is possible to provide the measurement parameters differently in the case of two different measurement cycles. The measurement parameters may be the geometry of the measurement movement and/or the speeds of the measurement movements and/or the scanning rates. Other measurement parameters are conceivable. In principle, it is possible to change the measurement parameters from one measurement sub-cycle 32 to another measurement sub-cycle 33. Reasons for changing the measurement parameters may be cycle time requirements, accuracy requirements or the like.

Very generally, there may also be provision for the above measurement parameters to be different within a measurement cycle, i.e. even within a measurement sub-cycle.

As already indicated, the solution in accordance with the proposal renders it possible to set the in-plane resolution of the measuring unit 5. In a measurement cycle, the distances between adjacent measurement points 11 on the bore inner surface 12 define the in-plane resolution of the measuring unit 5 for this measurement cycle. The in-plane resolution is adjustable by matching the measurement movement, in particular the speed of the measurement movement along a measurement curve on the bore inner surface 12, to the scanning rate. Here, it is the case that the in-plane resolutions are set differently within a measurement cycle or in the case of at least two different measurement cycles or measurement sub-cycles.

As a result of the explanations above, it becomes clear that the solution in accordance with the proposal provides virtually unlimited flexibility when ascertaining geometry parameters for the bore 3 to be measured, in particular as a result of dividing the measurement cycles into measurement sub-cycles 32, 33.

According to further teaching, a method for operating a manufacturing system 1 is also disclosed.

The essential aspects are that there is provision for a manufacturing process controller 17 for actuating the components of the manufacturing system 1, and that, by actuating the components of the manufacturing system 1, a sequence of drill cycles and optionally rivet cycles is worked through according to a manufacturing instruction and predetermined measurement cycles between predetermined drill cycles and/or rivet cycles are worked through according to a measurement instruction by means of the manufacturing process controller 17. Reference may be made to all embodiments relating to the operation of the manufacturing system 1 in accordance with the proposal.

In a particularly advantageous embodiment of the method, in which the advantages of the manufacturing system 1 are exploited in full, provision is made for at least some of the material plies 4a, 4b to be formed from different materials. In a configuration, at least one material ply 4a, 4b is formed from a non-metallic material, such as a fiber composite material. In view of the optical measuring unit 5, non-metallic material plies 4a, 4b may readily also be measured. This makes the solution in accordance with the proposal attractive, in particular for all types of composite materials.

The invention claimed is:

1. A manufacturing system for producing airplane structural components, comprising a drilling unit for producing bores in a material assembly made of at least two material plies for the purpose of inserting fastening elements, and comprising a measuring unit for ascertaining at least one geometry parameter for a previously produced bore,
   wherein the measuring unit produces an optical measurement beam for ascertaining a distance between a measuring lance and a measurement point on the respective bore inner surface, said optical measurement beam emerging from the measuring lance via the measuring optical unit and being incident on the measurement point on the respective bore inner surface,
   wherein there is provision for a measurement movement between the measuring lance and material assembly in a measurement cycle and the measuring unit cyclically ascertains distance values to various measurement points at a scanning rate during the measurement movement and ascertains at least one geometry parameter for the respective bore from the distance values;

wherein the measurement movement is a substantially spiral movement such that the measurement points lie on a substantially spiral measurement curve;

wherein there is provision for a manufacturing process controller for actuating the components of the manufacturing system and wherein, by actuating the components of the manufacturing system, the manufacturing process controller works through a sequence of drill cycles using the drilling unit and optionally rivet cycles using the riveting unit according to a manufacturing instruction and works through predetermined measurement cycles between predetermined drill cycles and/or rivet cycles according to a measurement instruction;

wherein a measurement cycle is directed only to some of the material plies or wherein one of the at least two measurement sub-cycles is directed to one material ply of the material assembly and wherein a further measurement sub-cycle of the at least two measurement sub-cycles is directed to a further material ply of the material assembly; and wherein the measuring lance has sufficient length to penetrate through the previously produced bore so as to measure the thickness of combined material plies through which the bore extends.

2. The manufacturing system as claimed in claim 1, wherein the manufacturing system comprises a riveting unit for riveting the material assembly.

3. The manufacturing system as claimed in claim 1, wherein the measuring lance plunges into the respective bore during a measurement cycle and the measurement beam extends substantially across the bore axis.

4. The manufacturing system as claimed in claim 1, wherein the drilling unit and the measuring unit are combined to form a processing head.

5. The manufacturing system as claimed in claim 1, wherein the measurement movement has a rotational component.

6. The manufacturing system as claimed in claim 1, wherein the measurement movement has a linear component.

7. The manufacturing system as claimed in claim 1, wherein there is provision for a drive arrangement for at least one of the motor-driven movement of the drilling unit the measuring unit, and an optionally provided riveting unit.

8. The manufacturing system as claimed in claim 1, wherein the at least one geometry parameter comprises the diameter or the roundness of the respective bore.

9. The manufacturing system as claimed in claim 1, wherein the respective bore has a countersink and wherein the at least one geometry parameter comprises the countersink depth, the countersink angle, or the countersink diameter of the bore.

10. The manufacturing system as claimed in claim 1, wherein the respective bore has a countersink, and wherein the at least one geometry parameter relates to the transition from the countersink to the bore shaft adjoining the countersink.

11. The manufacturing system as claimed in claim 1, wherein the at least one geometry parameter comprises a surface condition of the bore inner surface.

12. The manufacturing system as claimed in claim 1, wherein the at least one geometry parameter is the assembly strength of the material assembly along the bore axis.

13. The manufacturing system as claimed claim 1, wherein the at least one geometry parameter is the position of the separating plane between two material plies of the material assembly.

14. The manufacturing system as claimed in claim 1, wherein the at least one geometry parameter is the width of a gap possibly present between two material plies of the material assembly.

15. The manufacturing system as claimed in claim 1, wherein the measurement sub-cycles are worked through in succession and wherein the geometry parameters are ascertained for each of the measurement sub-cycles separately.

16. The manufacturing system as claimed in claim 15, wherein the at least two measurement sub-cycles are carried out in succession.

17. The manufacturing system as claimed in claim 1, wherein the measurement parameters are different in the case of at least two different measurement cycles or measurement sub-cycles.

18. The manufacturing system as claimed in claim 1, wherein, in a measurement cycle, the distances between adjacent measurement points on the bore inner surface define the in-plane resolution of the measuring unit for this measurement cycle, wherein the in-plane resolution is adjustable by matching the measurement movement to the scanning rate, and wherein the in-plane resolutions are set differently within a measurement cycle or in the case of at least two different measurement cycles or measurement sub-cycles.

19. The manufacturing system as claimed in claim 1, wherein the measurement parameters are different within a measurement cycle.

* * * * *